Figure 5:
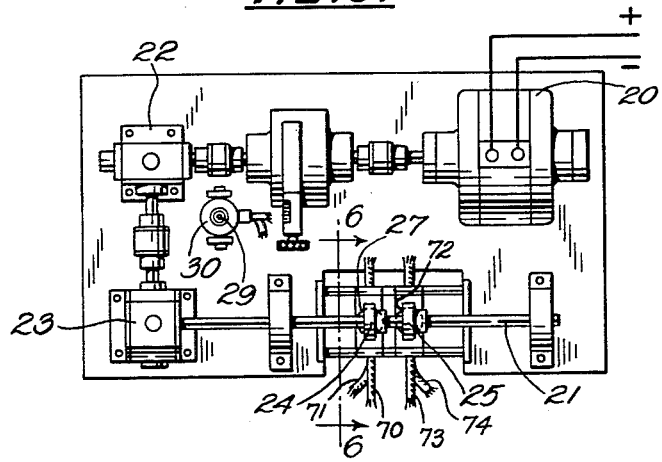

April 5, 1960   J. F. H. CUSTERS ET AL   2,931,351
POLISHING HARD CRYSTALLINE CARBON
Filed April 22, 1958   3 Sheets-Sheet 1
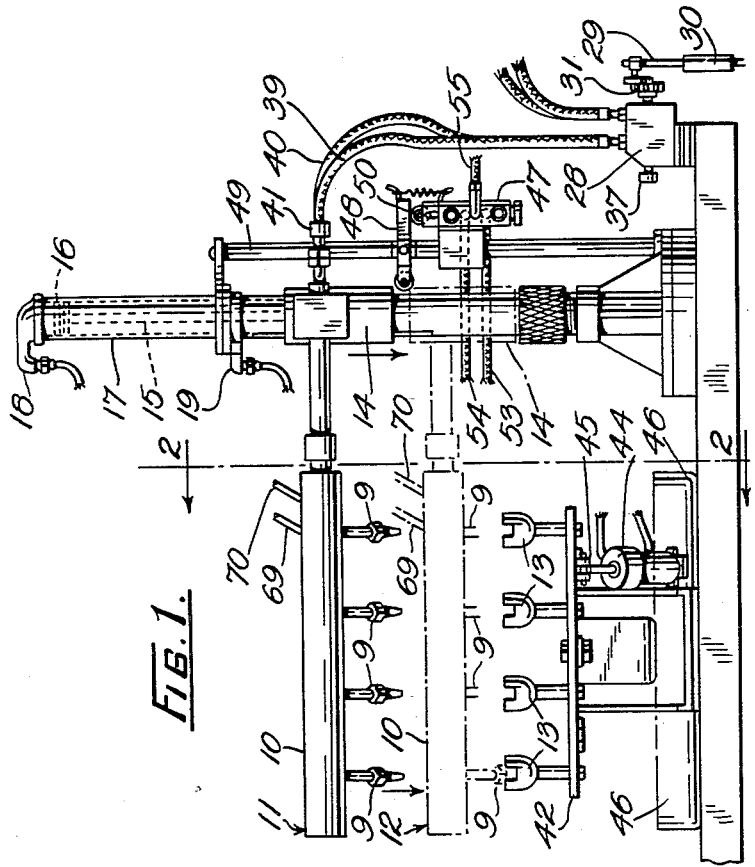
Inventors
J.F.H. Custers
H.B. Dyer
P.T. Wedepohl
By Glascock Downing Seibold
Attys.

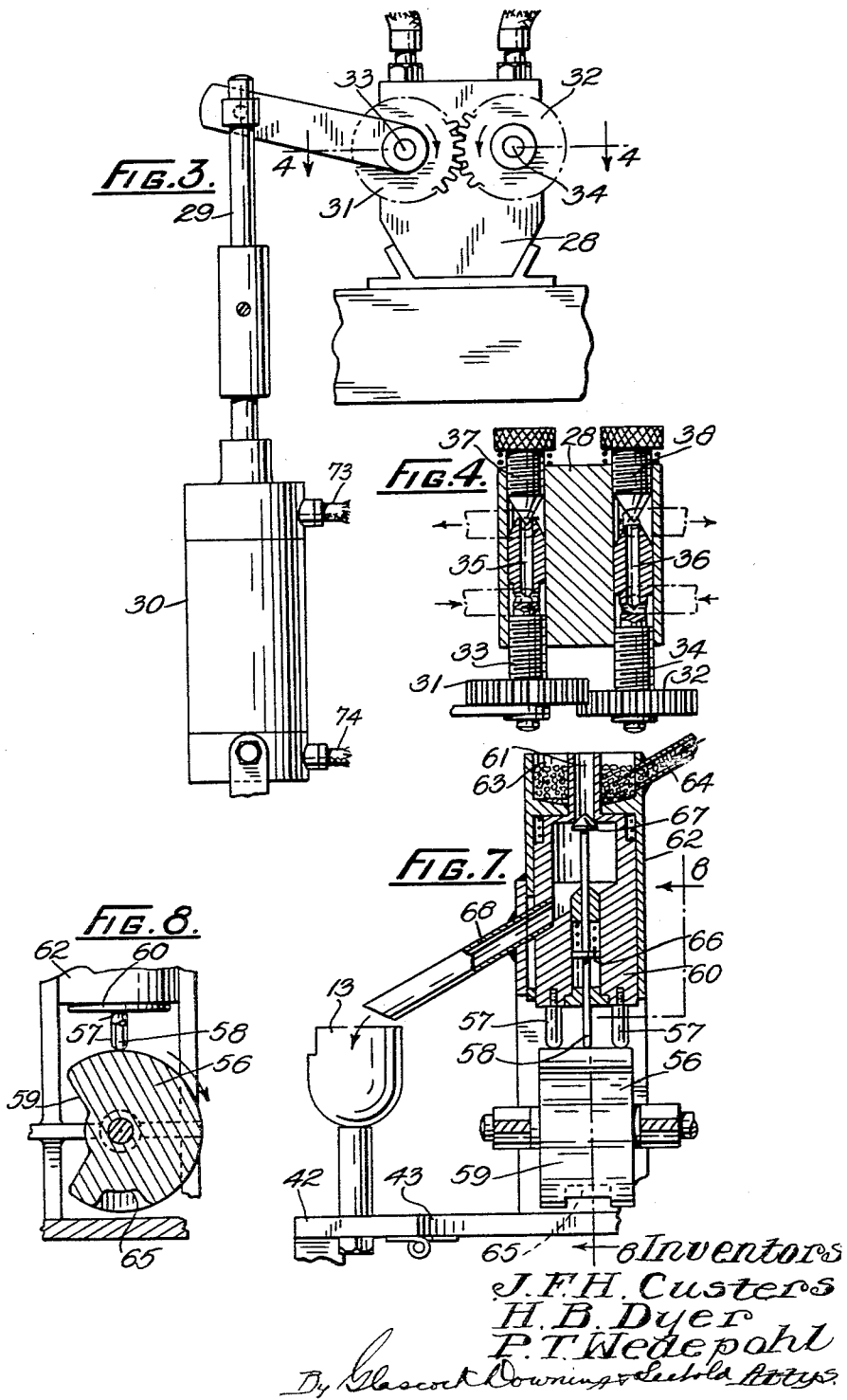

April 5, 1960  J. F. H. CUSTERS ET AL  2,931,351
POLISHING HARD CRYSTALLINE CARBON
Filed April 22, 1958  3 Sheets-Sheet 3

Inventors
J.F.H. Custers
H.B. Dyer
P.T. Wedepohl

# United States Patent Office 2,931,351
Patented Apr. 5, 1960

2,931,351

POLISHING HARD CRYSTALLINE CARBON

Jan F. H. Custers, Henry B. Dyer, and Peter T. Wedepohl, all of Johannesburg, Union of South Africa, assignors to De Beers Consolidated Mines Limited Application April 22, 1958, Serial No. 730,138

Claims priority, application Union of South Africa April 30, 1957

8 Claims. (Cl. 125—30)

This invention relates to the polishing of hard crystalline carbon such as diamond, boart, framesite, stewartite and the like.

It is well known that if a diamond is heated in the presence af a gas mixture containing oxygen to temperatures much in excess of 600° C., oxidisation of the diamond surfaces exposed to oxygen occurs, with consequent reduction in the size of the diamond. The attack of the oxygen is greater in certain small regions of the surface than in others. The usual effect of this preferential oxidisation is the production of etch pits, which increase in depth and area with time and temperature of oxidation. Such treatment results in a surface which is rough and pitted, and, to the naked eye, appears frosted.

The inventors have found that under certain conditions, which are controlled by methods devised by them, the oxidising action on the surface of a diamond may be made to produce a surface which is smoother than before treatment. By these methods, a smooth polished surface may be produced on a diamond which, initially, may have been rough or may have been made rough in a previous industrial or other process. It is believed that the process of the invention causes preferential removal of material from the asperities on the surface of a diamond.

An object of the invention is to provide a method of polishing diamonds of the kind specified with a rough surface, especially those intended for industrial use which are too small or of too low a value to be polished by conventional methods.

Throughout the specification and claims the word "diamond" will be used to cover all the hard crystalline forms of carbon referred to earlier.

According to the present invention a method of polishing a diamond includes the step of heat treating the diamond under oxidising conditions for a period sufficient to reduce asperities and to glaze the surface of the stone to a substantially uniform polish, sheen or gloss.

Further according to the invention the diamond is heated under non-oxidising conditions to a predetermined temperature before oxidising conditions are introduced. The oxidising treatment is preferably carried out rapidly to enhance the glaze on the surface of the stone.

Also according to the invention the diamond is elevated to a temperature within the range 1500 to 3000 degrees centigrade before oxidising conditions are introduced.

In the preferred form of the invention the diamond is treated in an oxy-acetylene flame, the flame being preferably such that whilst the diamond is being heated to the elevated temperature there is an excess of acetylene and that thereafter the flame has an excess of oxygen to effect oxidation.

Where a flame is used the diamond is heated in a crucible or the like, the flame being introduced into the mouth thereof.

The invention also provides apparatus for polishing a diamond, the apparatus including means to treat the diamond under oxidising conditions.

According further to the invention the apparatus includes means to elevate the temperature of the diamond prior to the introduction of oxidising conditions. The heat treating means and the temperature elevating means may be provided by a flame torch, the flame used to oxidise the surface of the diamond having an excess of oxygen as compared with that used to elevate the temperature of the diamond.

The preferred form of the apparatus is one in which an oxy-acetylene torch is used, an excess of acetylene being used during temperature elevation and an excess of oxygen during the oxidising treatment.

Where a flame is used the diamond is preferably located in a crucible provided by the apparatus. This crucible, for ease of operation, may be one which is movable into a position in which the diamond is allowed to gravitate therefrom after treatment. Best results are obtained where the apparatus includes means to agitate the diamond during treatment. In one arrangement the crucible is vibrated at least during treatment of the diamond.

To avoid unnecessary and time wasteful handling of diamonds the apparatus may include means automatically to dispense measured quotas into the crucible.

Figure 6:
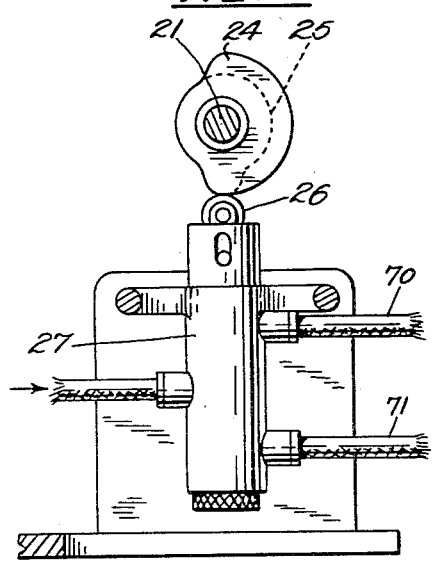

To illustrate the invention an embodiment is described hereunder with reference to the accompanying drawings in which Figure 1 is a front elevation with parts broken away of polishing apparatus according to the invention, Figure 2 is a sectional elevation with parts broken away on the line 2—2 of Figure 1, Figure 3 is an elevation with parts broken away of the mechanism for controlling the flow of gas to the burners, Figure 4 is a section on the line 4—4 of Figure 3, Figure 5 is a plan view of part of the equipment, Figure 6 is an elevation on the line 6—6 of Figure 5, Figure 7 is a sectional elevation partly in section of an automatic crucible loading device and Figure 8 is an elevation with parts broken away on the line 8—8 of Figure 7.

Basically, as seen in Figure 1, the apparatus includes a battery of oxy-acetylene torches 9 mounted on a gas manifold 10 which is adapted to move between a first position 11 (vide Figure 2) and a second position 12 in which the torches act to direct their flames into the mouths of crucibles 13.

To render the apparatus as automatic as possible or desirable the manifold is adapted to move between its two extreme positions through the agency of a sleeve 14 associated with the piston rod 15 of a piston 16 movable in a cylinder 17. When compressed air is allowed in through port 18 the piston is forced downwardly to move the sleeve into chain dotted position shown in Figure 1. The torches are now in second extreme position 12. To move the torches back in to the first extreme position (position 11) air is let into the cylinder through port 19 to lift the piston upwardly in the cylinder. When air is let through port 19 it exhausts from the top of the piston through port 18 and vice versa.

In the embodiment of the invention a diamond is to be treated under oxidising conditions after it has been heated to an elevated temperature in a neutral flame. The diamond or a certain weight of diamonds (preferably treated in the manner described in U.S. Patent No. 2,735,421) is or are fed into each crucible and heat is applied by flames rich in acetylene. When the elevated temperature has been reached the composition of each flame is altered to one in which an excess of oxygen is present. The diamonds are then subjected to the oxidising treatment for a given period before the flame is removed.

The apparatus of the invention carries out the method in a substantially fully automatic manner.

With the diamonds in the crucibles the machinery illustrated in Figure 5 causes the torch manifold to move the torches into the second extreme position referred to above. This is achieved in the following manner. An electric motor 20 causes rotation of a cam shaft 21 through a suitable arrangement of speed reducing gear boxes 22 and 23. On the cam shaft 21 two cams 24 and 25 are mounted each of which is associated with a follower 26 to control the flow of pressure air through valves 27 and 72. Cam 24 allows air to pass through pipes 70 and 71 to the cylinder ports 18 and 19 in accordance with the direction in which the manifold is to move. Thus, the timing is such that when oxidising of the diamonds is complete the cam immediately causes the follower to allow air to pass through the valve 27 via pipe 71 to the underside of piston 16 to return the manifold and the torches to position 11.

A further automatic feature of the apparatus is the control of the flame. Figures 3 and 4 show a regulating valve 28 controlled by the piston rod 29 of a piston-cylinder combination 30. The valve 28 has two inlets and two outlets as illustrated in Figure 4 and the structure of the valve is such that on movement of the piston rod 29 the flow of gas through each passage is regulated. In this manner the passage of acetylene and oxygen through the valve 28 is governed. It will be seen from an examination of Figure 4 that the piston rod is adapted to rotate two intermeshing gears 31 and 32. The gears are associated with partially threaded shanks 33 and 34 which have central ducts 35 and 36 passing through their forward ends. These ducts allow oxygen and acetylene to pass through their respective feed lines from the inlet to the outlet of the valve. Regulation of the flow through the valve may be adjusted by adjusting screws 37 and 38 which may be used to close the effective orifices at the tips of the shanks. In the embodiment both shanks are right hand threaded so that when rotation of the gears takes place on path through the valve tends to open and the other tends to shut.

From the valve 28 each gas flows in its own tube (39, 40 in Figure 1) to a junction piece 41 where actual mixing takes place. This mixed gas then passes into the manifold for distribution to the torches.

As previously mentioned the process starts by heating up the diamonds to a predetermined temperature and then treating them in a flame containing an excess of oxygen. The movement of piston rod 29 is governed to coincide with the requirements of the process.

Cam 25 on the cam shaft 21 acts to allow pressure air to pass through its associated valve 72 and pipes 73 or 74 to cause movement of the piston in the piston-cylinder combination 30.

Yet another automatic feature of the invention is the arrangement whereby the diamonds, after treatment, are tipped out into a bath of quenching fluid, a step in the preferred method of polishing diamonds.

In Figures 1 and 2 the crucibles are shown mounted on a platform 42 which is hingedly coupled to structure 43. On the structure a piston-cylinder combination 44 is mounted, the free end of the piston rod 45 being pivotally secured to the platform and the arrangement being such that movement of the rod into the cylinder causes the platform to tilt the crucibles into the chain-dotted position shown in Figure 2. In the latter position the diamonds spill out into the quenching fluid in bath 46.

Movement of the piston rod is brought about automatically according to the stage reached in the treatment of the diamond. In the embodiment in question a two way valve 47 is operated by an arm 48 pivotally secured to an upright 49. On the free end of the arm there is a roller which engages with the sleeve 14. Downward movement of the sleeve allows the other end of the arm to rise and the follower 50 thereunder to move upwardly under a biasing action. Air now has a passage to the underside of the piston to maintain the crucibles in the full line position of Figure 2. On the other hand upward movement of the sleeve forces the follower down, closes the path to the underside of the piston and opens a path to the topside thereof. The piston is then forced down in the cylinder and the crucibles are tilted to discharge their contents. The arrangement of the apparatus is such that for the great bulk of a cycle the crucibles are in the normal full line position while tilting and return to the normal position are effected rapidly. In Figure 2 the air inlets 51 and 52 are coupled to air leads 53 and 54 on the outlet side of valve 47, lead 55 being the air supply line to the valve.

In the preferred embodiment of the invention the diamonds are fed into the crucibles mechanically and automatically. Figures 7 and 8 show suitable apparatus for feeding batches of diamonds into the crucibles on a weight basis. A cam 56 rotates at a governed speed and in step with the remainder of the apparatus. The cam has three associated followers, two outer followers 57 and a central follower 58. All the followers descend simultaneously into a common valley 59 on the cam to allow the piston-like structure 60 and the cylindrical receptacle 61 to move downwardly in relation to the outer shell 62. The extent of the downward movement is such as to allow the receptacle to be filled with diamonds gravitationally from a stock thereof in reservoir 63. This reservoir is permanently replenished through feed pipe 64.

The followers then rise up out of the valley 59 to restore the structure and receptacle to the position shown in Figure 7. Immediately thereafter the central follower, i.e. follower 58, descends into a valley 65. Follower 58 is associated with a piston 66 which slides within a cylindrical cavity in the structure 60 and includes a fore-end 67 which forms the base of the receptacle 61. By descending into the valley 65 the follower 58 acts to open up the bottom of the receptacle to allow diamonds therein to flow out into the crucible through chute 68.

It is predetermined that the receptacle when filled to capacity will contain a given weight of diamonds.

Best results are achieved when the diamonds are agitated during treatment. To this end the crucibles are preferably caused to vibrate at least during the time in which oxidising conditions prevail. The manifold 10 in the embodiment is surrounded by a jacket in which cooling liquid circulates, references 69 and 70 representing inlet and outlet pipes to the jacket.

In practice it has been found that the product of the method is a diamond possessing a substantially uniform polish of a very serviceable quality.

We claim:

1. A method of polishing a diamond comprising the steps of subjecting the diamond to the action of a flame having an excess of acetylene to heat the diamond to a predetermined temperature, and thereafter subjecting the diamond to the action of a flame having an excess of oxygen for a time period sufficient to reduce asperities in the diamond and glaze the diamond surface to a substantially uniform polish.

2. A method of polishing a diamond as claimed in claim 1, including the initial step of rounding the diamond surface.

3. A method of polishing a diamond as claimed in claim 2, including the further step of rapidly cooling the diamond after its being subjected to the flame having an excess of oxygen.

4. A method of polishing a diamond as claimed in claim 1, in which the diamond is heated by the action of a flame having an excess of acetylene to a temperature within the range of 1500 to 3000° C.

5. A method of polishing a diamond comprising directing an oxy-acetylene flame rich in acetylene on the diamond until the diamond reaches a predetermined temperature, and immediately thereafter adjusting the composition of the flame to be rich in oxygen thereby reducing the asperities in the diamond and glazing the diamond surface to a substantially uniform polish.

6. An apparatus for polishing diamonds comprising in combination, a burner nozzle, valves controlling the flow of oxygen and acetylene to the nozzle, a crucible for containing the diamonds to be treated and movable between an upright position and a discharge position, means to reciprocate the nozzle between two positions in the first of which positions the nozzle clears the crucible in the upright position and in the second of which positions the nozzle enters the mouth of the crucible in the upright position, motion transmitting mechanism between the nozzle reciprocating means and the crucible arranged to move the crucible to the discharge position when the nozzle moves from the second position to the first position and to move the crucible to the upright position when the nozzle moves from the first position to the second position and means so controlling the valves that at all times the proportions of oxygen and acetylene are such that a flame burning at the nozzle is non-oxidizing excepting that at a predetermined instant after the nozzle has moved into the second position, the mixture is changed to give an oxidizing flame and remains so until the nozzle moves to its first position.

7. The apparatus claimed in claim 6, in combination with a container for diamonds, means to isolate a predetermined quanta of diamonds, means to discharge such quanta into the crucible when the crucible is in the upright position, and motion transmitting mechanism between the crucible and the isolating means and discharge means so arranged that upon movement of the crucible into its discharge position, a quanta is isolated and upon movement of the crucible to its upright position such quanta is discharged into the crucible.

8. A method of polishing a diamond comprising the steps of initially heating the diamond to a temperature of between 1500 to 3000° C. in a non-oxidising atmosphere, and immediately thereafter heating the diamond in an oxidising atmosphere for a period of time sufficient to reduce asperities on the diamond and glaze the diamond surface to a substantially uniform polish.

References Cited in the file of this patent

UNITED STATES PATENTS

| 2,552,873 | Smith | May 15, 1951 |
| 2,621,916 | Murphy | Dec. 16, 1952 |

FOREIGN PATENTS

| 475,683 | Great Britain | Nov. 24, 1937 |

OTHER REFERENCES

Industrial Diamond Review, "Application of Heat" May 1949, volume 9, pages 155–156. (Copy in Division 58.)